United States Patent
Yuksel (10) Patent No.: US 9,111,282 B2
(45) Date of Patent: Aug. 18, 2015

(54) METHOD AND SYSTEM FOR IDENTIFYING BUSINESS RECORDS

(75) Inventor: Baris Yuksel, New York, NY (US)

(73) Assignee: Google Inc., Mountain View, CA (US)

(*) Notice: Subject to any disclaimer, the term of this patent is extended or adjusted under 35 U.S.C. 154(b) by 142 days.

(21) Appl. No.: 13/076,955

(22) Filed: Mar. 31, 2011

(65) Prior Publication Data

US 2015/0154609 A1 Jun. 4, 2015

(51) Int. Cl.
*G06Q 30/00* (2012.01)
*G06F 17/30* (2006.01)
*G06K 9/62* (2006.01)

(52) U.S. Cl.
CPC ...... *G06Q 30/0185* (2013.01); *G06F 17/30705* (2013.01); *G06K 9/62* (2013.01)

(58) Field of Classification Search
CPC ........... H04L 63/1441; H04L 63/1483; G06Q 30/0248; G06F 2221/2119; G06F 17/3089; H04W 12/12
See application file for complete search history.

(56) References Cited

U.S. PATENT DOCUMENTS

| | | | | |
|---|---|---|---|---|
| 7,548,956 B1* | 6/2009 | Aoki et al. | | 709/207 |
| 7,895,515 B1* | 2/2011 | Oliver et al. | | 715/237 |
| 7,962,510 B2* | 6/2011 | Najork et al. | | 707/771 |
| 7,979,369 B2* | 7/2011 | Grenier et al. | | 706/20 |
| 8,904,040 B2* | 12/2014 | Adelman et al. | | 709/245 |
| 2004/0128355 A1* | 7/2004 | Chao et al. | | 709/206 |
| 2005/0015455 A1 | 1/2005 | Liu | | |
| 2005/0015626 A1* | 1/2005 | Chasin | | 713/201 |
| 2005/0132060 A1* | 6/2005 | Mo et al. | | 709/227 |
| 2005/0240617 A1* | 10/2005 | Lund et al. | | 707/102 |
| 2006/0069732 A1 | 3/2006 | Shannon et al. | | |
| 2006/0190481 A1* | 8/2006 | Alspector et al. | | 707/103 R |
| 2006/0253579 A1* | 11/2006 | Dixon et al. | | 709/225 |
| 2007/0299916 A1* | 12/2007 | Bates et al. | | 709/206 |
| 2008/0082658 A1 | 4/2008 | Hsu et al. | | |
| 2008/0133672 A1* | 6/2008 | Gillum | | 709/206 |
| 2008/0208858 A1* | 8/2008 | Kim et al. | | 707/6 |
| 2008/0270549 A1* | 10/2008 | Chellapilla et al. | | 709/206 |
| 2009/0048922 A1* | 2/2009 | Morgenstern et al. | | 705/14 |
| 2009/0089285 A1* | 4/2009 | Donato et al. | | 707/6 |
| 2009/0198673 A1* | 8/2009 | Gao et al. | | 707/5 |
| 2009/0222435 A1* | 9/2009 | Andersen et al. | | 707/5 |
| 2009/0282081 A1* | 11/2009 | Kamvar et al. | | 707/104.1 |
| 2009/0319377 A1* | 12/2009 | Gazetova et al. | | 705/14.73 |

OTHER PUBLICATIONS

"Characterizing the Splogosphere," by Kolari et al. In: WWW2006 (2006). Available at: http://www.ra.ethz.ch/CDstore/www2006/www.blogpulse.com/www2006-workshop/papers/splogosphere.pdf.*

(Continued)

*Primary Examiner* — Daniel Kinsaul
(74) *Attorney, Agent, or Firm* — Lerner, David, Littenberg, Krumholz & Mentlik, LLP (57) ABSTRACT

A method and system as described identifies business records. A business listing stores one or more business records. In order to filter spam records, the method and system operate to identify whether a target business record is a spam business record. To identify the target record as a spam record, the method and system compare extracted characteristics of the target record with characteristics of known spam or good business records. Depending upon the similarity with the known business records, the target business record is identified as a spam record or a good record.

10 Claims, 5 Drawing Sheets

(56) References Cited

OTHER PUBLICATIONS

"Characterizing Web Spam Using Content and HTTP Session Analysis," by Webb et al. In: CEAS 2007 (2007) Available at: http://citeseerx.ist.psu.edu/viewdoc/download?doi=10.1.1.86.5184&rep=rep1&type=pdf.*

"Characteristics and Detection of Link Farm Spam Pages," by Tung, Tan Su. In: Department of Information Technology of Malaysia University fo Science and Technology (2006). Available at: http://library.must.edu.my/v2005/HTML/LibraryCollections/MUST-Theses/2003-2004/Information%20Technology/Tan%20Su%20Tung.pdf.*

"Google's Recent Changes to its Local Algorithm," by Vatsa, Shagun. In: Local Search Simplified by Shagun Vatsa (Sep. 29, 2009). Available at: http://www.shagunvatsa.com/googles-recent-changes-to-its-local-algorithm.*

* cited by examiner

METHOD AND SYSTEM FOR IDENTIFYING BUSINESS RECORDS

BACKGROUND OF THE INVENTION

A strong web presence is vital to the success of modern businesses. In addition to the traditional marketing vehicle of a company web site, businesses are increasingly indexed with a variety of secondary sources. Examples of these secondary sources include search engines, mapping providers that provide directions to the place of business, review sites allowing users to rate their purchase experience, social networking sites that allow users to "link" to particular businesses to which they may be associated, and more. These secondary sources typically allow for business owners to make their business available via various searching and indexing methods. For example, a social networking site may allow a user to search for a particular type of business within a certain number of social "links" of the user, or a mapping provider may allow for the user to search for a particular business within a certain geographical radius.

However, by allowing business owners to submit their own records for listing, these secondary sites also provide an opportunity for malicious and opportunistic users to include false records. For example, a user may list a false store front in a major metropolitan area, including a link to a mail order service in another country, or a user may list a business purporting to sell authentic merchandise, when in fact the listing links to a site selling counterfeit goods. Even worse, many of these listings may link to malicious software and function as virus delivery vectors. These false record listings reduce the "signal-to-noise" ratio of search results and interfere with site usability. Therefore, there is a need in the art for an improved system and method for identifying business records.

BRIEF SUMMARY OF THE INVENTION

A method and system as described identifies business records. A business listing stores one or more business records. In order to filter spam records, the method and system operate to identify whether a target business record is a spam business record. To identify the target record as a spam record, the method and system compare extracted characteristics of the target record with characteristics of known spam or good business records. Depending upon the similarity with the known business records, the target business record is identified as a spam record or a good record.

In one aspect, the invention is a computer implemented method for identifying business records. The method comprises using a computer processor to extract one or more characteristics from a target business record. The extracted characteristics are compared to a set of known characteristics associated with a known business record of a known type. A similarity value is generated based on the comparison of the extracted characteristics and the set of known characteristics. A business record type is identified based on the similarity value and the known business record type. In one aspect, the type of the known business record is a spam business record. In another aspect, the type of the known business record is a non-spam business record. In some aspects, the known characteristics are stored within a characteristic database, and the characteristic database comprises a set of identified characteristics associated with a type of business record. In another aspect, the method further comprises updating the characteristic database with the extracted characteristics in response to determining a type of the target business record. In yet another aspect, the target business record is associated with a particular account. In such cases, the method may further comprise determining one or more linked business records associated with the particular account, identifying one or more additional characteristics associated with the one or more linked business records, and storing the one or more additional characteristics in the characteristic database. The one or more additional characteristics may be linked to a same type of business record as the target business record.

In some aspects, the characteristics comprise at least one of a key word, an address, a phone number, or a type of business. In some aspects, the business records are stored on a business listing server.

Aspects of the invention may further comprise a non-transitory computer-readable storage medium comprising instructions that, when executed by a computer process, cause the processor to execute a method. The method may comprise using a computer processor to extract one or more characteristics from a target business record, comparing the extracted characteristics to a set of known characteristics associated with a known business record of a known type, generating a similarity value based on the comparison of the extracted characteristics and the set of known characteristics, and identifying a business record type of the target business record based on the similarity value and the known business record type. In another aspect, the type of the known business record is a spam business record. In a further aspect, the type of the known business record is a non-spam business record.

The known characteristics may be stored within a characteristic database. The characteristic database comprises a set of identified characteristics associated with a type of business record. The characteristic database may be updated with the extracted characteristics in response to determining a type of the target business record. The target business record may be associated with a particular account, and the method may further comprise determining one or more linked business records associated with the particular account, identifying one or more additional characteristics associated with the one or more linked business records, and storing the one or more additional characteristics in the characteristic database. The one or more additional characteristics may be linked to a same type of business record as the target business record. In another aspect, the characteristics comprise at least one of a key word, an address, a phone number, or a type of business. The business records may be stored on a business listing server.

In a yet further aspect, the invention may be a processing system for identifying business records. The processing system comprises at least one processor, a listing identification module associated with the at least one processor, and a memory for storing data including at least one target business record and at least one known business record of a known type, the memory coupled to the at least one processor. The listing identification module is configured to extract one or more characteristics from the target business record, compare the extracted characteristics to a set of known characteristics associated with the known business record, generate a similarity value based on the comparison of the extracted characteristics and the set of known characteristics, and identify a business record type of the target business record based on the similarity value and the known business record type.

DETAILED DESCRIPTION

Aspects of the invention describe a system and method for identification of spam business records on a business listing server. The business listing server facilitates an expeditious identification of potentially false listings by comparing characteristics of records within a database to characteristics associated with known spam or known true records. Records that share similar characteristics to known spam records are thus identified as spam records, and records that have similar characteristics to known true records are identified as true records. Hence, the aspects of the business listing server 104 serve to ensure that business listings are "true" listings, and that only true listings are presented to users and services accessing the business listing server 104.

Figure 1:
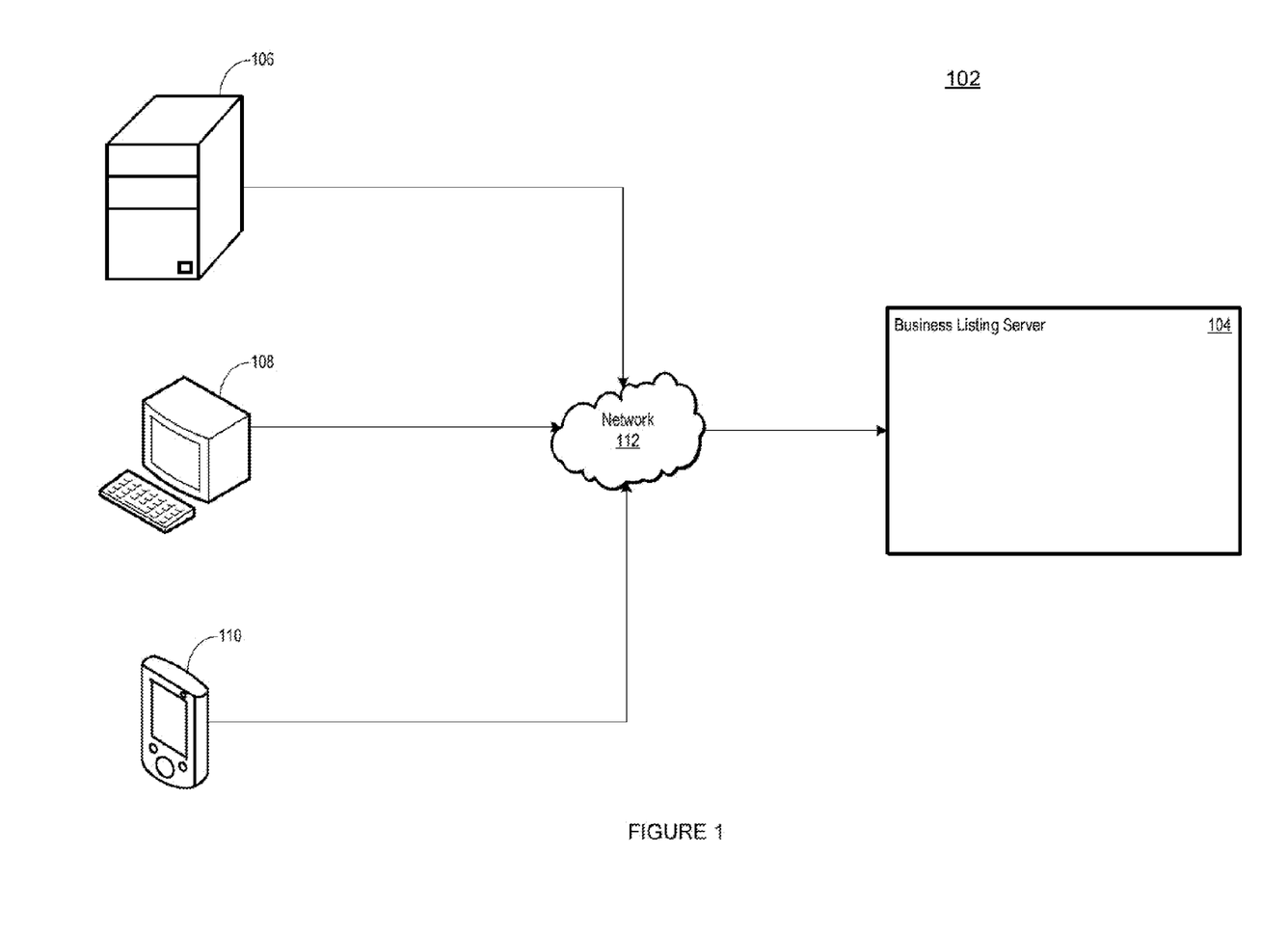
FIG. 1 is a block diagram depicting an apparatus and system for detecting spam requests for a business listing in accordance with aspects of the invention.

FIG. 1 illustrates one example of a system 102 for identifying business records. The system 102 may include a business listing server 104 in communication with client devices 106-110 via a network 112. The business listing server 104 maintains records which define a set of business listings. A business listing may include many different types of information about the business, such as the business' title (e.g., corporate business name ("Google, Inc."), informal business name ("Google"), etc.), the business' phone number, a URL for the business, a description of the business, hours of operation, or any other type of information about the business.

The client devices 106-110 may comprise many different types of client devices, and the business listing server 104 may provide business listings of a type and in a manner relevant to the type of client device. For example, an Internet search provider 106 operative to provide one or more search results may include a business listing provided by the business listing server 104. Where the client device 106 is an Internet search provider, the business listing server 104 may provide one or more business listings to the Internet search provider 106 in response to requests for those business listings. For example, the Internet search provider 106 may receive a search query from a user, and the Internet search provider 106 may communicate with the business listing server 104 to include one or more business listings in the search results that the Internet search provider 106 may provide to the user.

The client device 106 may also be a social network provider or a local search provider that communicates with the business listing server 104 to provide one or more business listings in response to queries that the client device 106 may receive from one or more users.

The client device 106 may alternatively be a map service provider or navigation assistance provider, where the information for one or more points of interest presented on a map provided by the client device 106 is based on one or more business listings provided by the business listing server 104. In other words, the client device 106 may be any system or other provider that communicates with the business listing server 104 to retrieve and/or request one or more business listings.

The business listing server 104 may also comprise an Internet search provider that provides one or more business listings to one or more end users, such as users using client devices 106-110. Moreover, the business listing server 104 may comprise any one or more of the aforementioned systems for providing business information to one or more end users, such as a map service provider, a local search provider, a social network provider, or any other type of Internet service.

The client devices 106-110 may include a desktop computer 108 in use by a user to conduct Internet searches using the business listing server 104. The desktop computer 108 may transmit one or more search queries to the business listing server 104 and, in response, the business listing server 104 may include one or more business listings in the search results sent to the desktop computer 108. As discussed below, the business listing information provided to the desktop computer 108 may include one or more Uniform Resource Locations ("URLs") for one or more websites associated with the business listings provided to the desktop computer 108. The user may select one or more of the URLs to visit the websites associated with the business listings. A website URL for a business listing is one of many different types of business listing information that the business listing server 104 may provide, and additional types of business information are discussed further below.

The client device 110 may be a mobile device 110, such as a laptop, a smart phone, a Personal Digital Assistant ("PDA"), a tablet computer, or other such mobile device. As with the desktop computer 108, the mobile device 110 may transmit one or more queries to the business listing server 104, such as search queries or navigation queries, and the business listing server 104 may incorporate one or more business listings in the response sent to the mobile device 110. Hence, whether the client devices 106-110 are systems 106 (e.g., Internet search providers, local search providers, social network providers, etc.), desktop computers 108, mobile devices 110 (e.g., laptops, smartphones, PDAs, etc.), the business listing server 104 may be operative to provide one or more business listings to the client devices 106-110 based on a request for the one or more business listings.

When a business listing is requested from the business listing server 104, the business listing server 104 may transmit a response that includes a complete business listing. The requesting party may parse the business listing to extract a subset of business information for the requesting party's use. For example, an Internet search provider may request a business listing from the business listing server 104 in response to an Internet search query by an end user. When the Internet search provider receives the business listing, the Internet search provider may then transmit the business' title and associated URL to the end user, rather than the complete set of business information that the Internet search provider initially received. Of course, the Internet search provider may provide the complete set of business information to the end user.

The business listing server 104 may be operative to transmit a select portion of the business listing to a requesting party. Using the Internet search provider example above, the business listing server 104 may receive a request for a business listing title and business listing URL, and based on this request, the business listing server 104 may transmit the business' title and associated URL to the Internet search provider. However, it should be understood that the examples above may also apply where the business listing server 104 communicates with the end user (e.g., client devices 108-110). Hence, the business listing server 104 is flexible and robust enough such that it may provide a complete business listing or a subset of the business listing, depending on the request that the business listing server 104 receives.

The network 112 may be implemented as any combination of networks. As examples, the network 112 may be a Wide Area Network ("WAN"), such as the Internet; a Local Area Network ("LAN"); a Personal Area Network ("PAN"), or a combination of WANs, LANs, and PANs. Moreover, the network 112 may involve the use of one or more wired protocols, such as the Simple Object Access Protocol ("SOAP"); wireless protocols, such as 802.11a/b/g/n, Bluetooth, or WiMAX; transport protocols, such as TCP or UDP; an Internet layer protocol, such as IP; application-level protocols, such as HTTP, a combination of any of the aforementioned protocols, or any other type of network protocol now known or later developed.

Communication between and within the business listing server 104 and the network 112 may be implemented using one or more interfaces, such as Web Services, or Enterprise Service Bus interfaces. Other examples of interfaces include message passing, such as publish/subscribe messaging, shared memory, and remote procedure calls.

Figure 2:
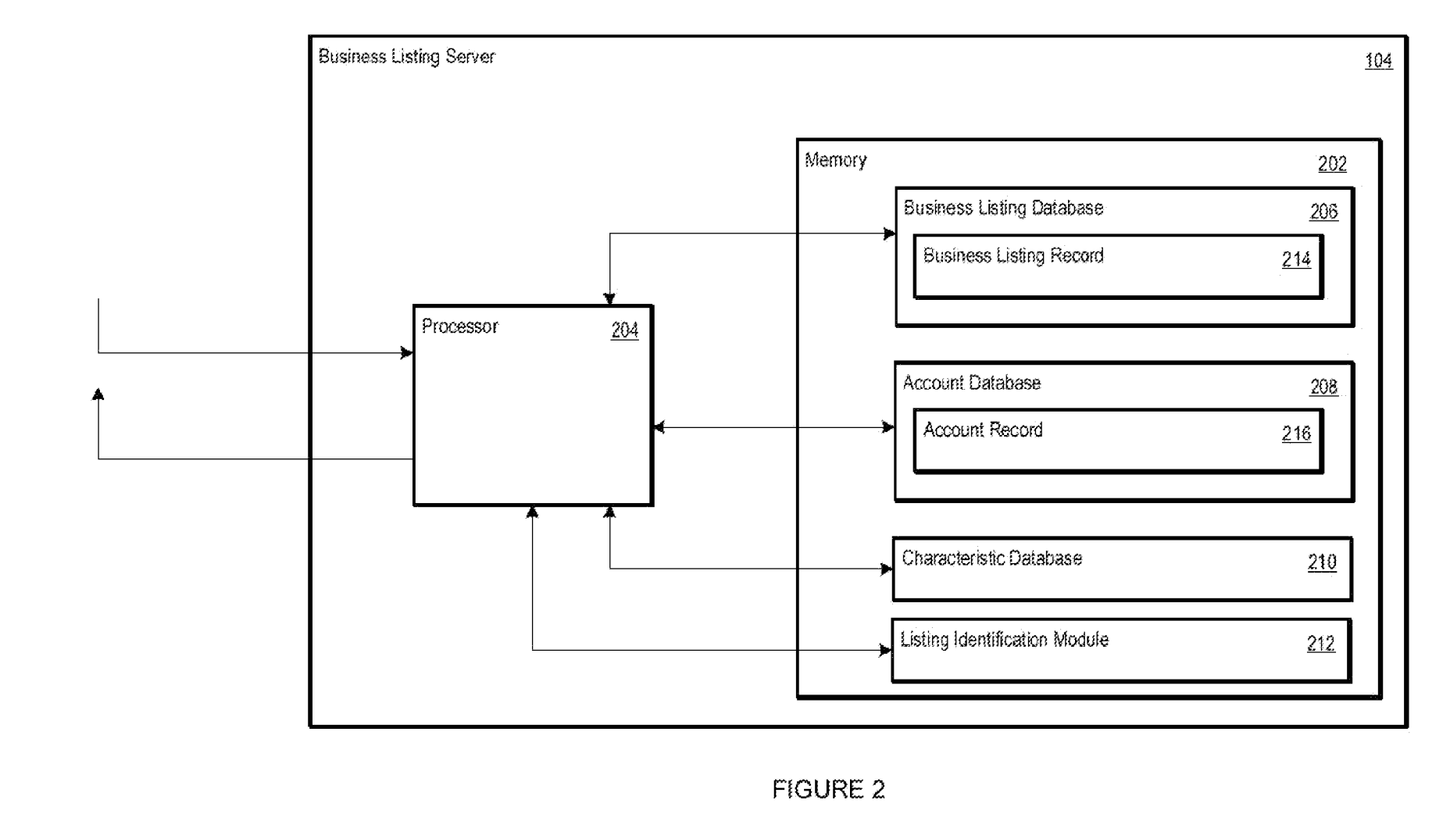
FIG. 2 is a block diagram depicting a business listing server in accordance with aspects of the invention.

FIG. 2 is one example of the business listing server 104. The business listing server 104 may include a memory 202 in communication with a processor 204. The memory 202 may be operative to store a business listing database 206, an account database 208, a characteristic database 210, and a listing identification module 212.

The business listing database 206 may store one or more business listing records 214. A business listing record 214 may store information about the business, such as the business' title, the business' phone number, the description about the business, the business' postal address, the URL for the business' website, the business' hours of operation, or other such business information.

A business listing record 214 may be associated with one or more user accounts. A user may communicate with the business listing server 104 to establish the business listing record 214. For example, the user may fill out a form, such as an online form, a paper form, or combination thereof, and provide the business listing information that business listing server 104 uses to establish the business listing record 214. Moreover, a user may have established multiple business listings with the business listing server 104. In other words, more than one business listing record 214 may be assigned to a user. As discussed below, the business listing server 104 may account for the business listing records 214 assigned to a user in determining whether the requests for business listings that the business listing server 104 receives are spam requests (e.g., requests that are used to inflate the importance or relevance of the business listing).

The account database 208 may store a plurality of account records 216. An account record 216 may comprise a unique identifier for a user. The user may log in using the identifier for the purpose of posting business listing records to the business listing database 206. Such accounts may be freely available such that any user may post a business record listing, or they may be provided on a subscription basis. For example, a business owner may pay a fee to list their business with a particular advertiser or listing service for marketing purposes. Each account record 216 may be associated with the one or more business listing records 214 the account has posted to the business listing server 104. Each account record 216 may have an associated "spam" score. The spam score is a value that rates the likelihood that the account is to be associated with a listing spammer. Methods by which the spam score may be calculated are described below (See FIG. 5).

The business listing server 104 may further comprise a characteristic database 210. The characteristic database 210 stores characteristic elements of the various business listing records 214 and account records 216 within the business listing database 206 and the account database 208, respectively. For example, spam listings may be businesses which claim to be at a specific address but are not actually located there. A listing might say 'Emergency Locksmith, 187 E4th St.' but there exists no such business at that location. The phone number of this listing might forward to the phone number of the spammer, who then serves the caller. The characteristic database 210 is used by the listing identification module 212 to perform calculations to identify business records. Aspects of the structure and contents of the characteristic database 210 are described further below (See FIG. 3).

The business listing server 104 may also comprise a listing identification module 212. The listing identification module 212 executes logic to identify the business records stored within the business listing database 206. The listing identification module 212 typically accesses the characteristic database 210 to identify various characteristics of known good and known spam listings. The listing identification module 212 then uses various techniques, such as, but not limited to, similarity calculations and machine learning methods to identify similar characteristics within other listings. While the listing identification module 212 is described herein as an element of the business listing server 104 executing on the processor 204, similar logic could be executed by a separate computing device in a networked environment, using an application-specific interface circuit (ASIC) or field-programmable gate array (FPGA), or the like. Methods by which the listing identification module 212 identifies the business listing records are described further with respect to FIGS. 4 and 5. For example, the processor 204 may request a moderator or other system to confirm that the identified listings are spam listings. The processor 204 may not request verification, but may assume that the identified business listings were, in fact, spam requests.

The business listing server 104 described above may be implemented in a single system or partitioned across multiple systems. In addition, the memory 202 may be distributed across many different types of computer-readable media. The memory 202 may include random access memory ("RAM"), read-only memory ("ROM"), hard disks, floppy disks, CD-ROMs, flash memory or other types of computer memory.

The business listing database 206, the account database 208, the characteristic database 210, and the listing identification module 212 may be implemented in a combination of software and hardware. For example, the listing identification module 212 may be implemented in a computer programming language, such as C# or Java, or any other computer programming language now known or later developed. The listing identification module 212 may also be implemented in a computer scripting language, such as JavaScript, PHP, ASP, or any other computer scripting language now known or later developed. Furthermore, the listing identification module 212 may be implemented using a combination of computer programming languages and computer scripting languages.

In addition, the business listing server 104 may be implemented with additional, different, or fewer components. As one example, the processor 204 and any other logic or component may be implemented with a microprocessor, a microcontroller, a DSP, an application specific integrated circuit (ASIC), discrete analog or digital circuitry, or a combination of other types of circuits or logic. The business listing database 206, the account database 208, and the characteristic database 210, and the listing identification module 212 may be distributed among multiple components, such as among multiple processors and memories, optionally including multiple distributed processing systems.

Logic, such as programs, may be combined or split among multiple programs, distributed across several memories and processors, and may be implemented in or as a function library, such as a dynamic link library (DLL) or other shared library. The DLL, for example, may store code that implements functionality for a specific module as noted above. As another example, the DLL may itself provide all or some of the functionality of the system.

The business listing database 206 and the account database 208 may be stored as a collection of data. For instance, although the business listing database 206 and the account database 208 are not limited by any particular data structure, the business listing database 206 and the account database 208 may be stored in computer registers, as relational databases, flat files, or any other type of database now known or later developed.

Figure 3:
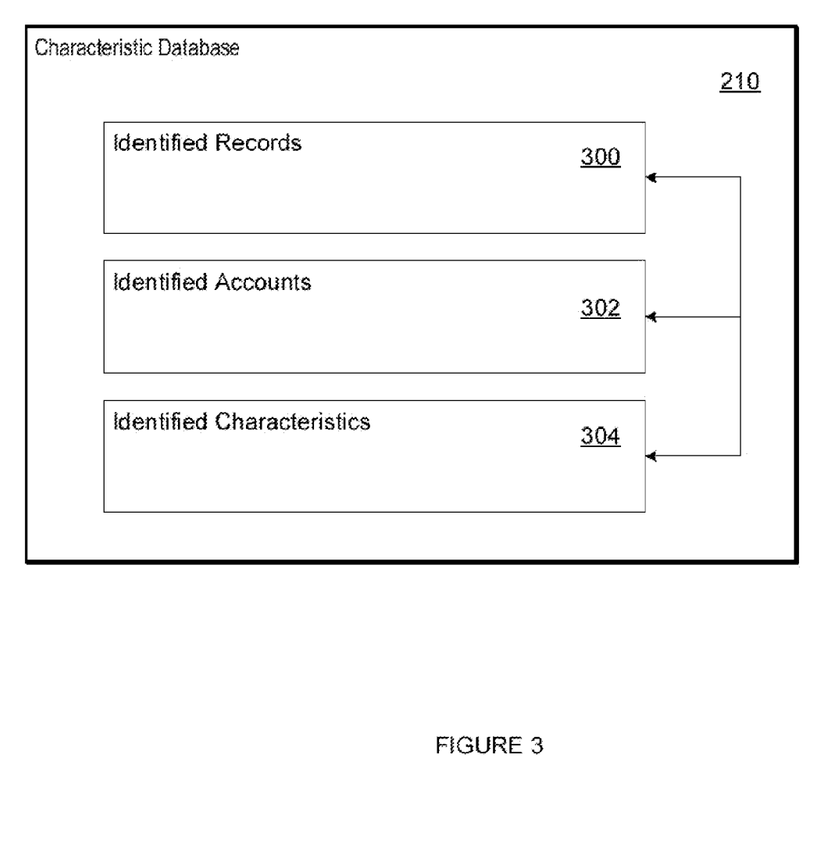
FIG. 3 is a block diagram depicting a characteristics database in accordance with aspects of the invention.

FIG. 3 is a block diagram depicting a characteristic database 210 in accordance with aspects of the present invention. The characteristic database 210 may comprise one or more identified records 302, one or more identified accounts 304, and one or more identified characteristics 306.

The identified records 302 generally comprise business listing records, such as the business listing records 214 stored within the business listing database 204 described with respect to FIG. 2. These identified records 302 have been identified as either spam or "good" by elements of the system 100. For example, the identified records 302 may have been classified by the listing identification module 212. The identified records 302 may have been manually identified by one or more users, administrators, or moderators of the system, in order to "seed" the database with information. Each identified record 302 is either a spam record, i.e. a false record inserted by a malicious user, or a "good" record, i.e. a record that is known to be associated with a legitimate business. The identified records 302 may be linked to the identified accounts 304 and the identified characteristics 306. For example, each of the identified records 302 was posted by a particular account. If that particular account has been identified as a spam or good account, then the identified record 302 would be associated with the appropriate identified account 304. Identified records 302 may be identified by a process as described with respect to FIGS. 4 and 5.

The characteristic database 210 further comprises a set of identified accounts 304. As described above, the identified accounts 304 are accounts that have been flagged as known spam or good accounts. The identified accounts 304 may be determined to be spam or good by a spam score. If a particular account has a spam score above a certain threshold, that account may be identified as a spam account. A method by which accounts may be determined to be spam accounts is described further with respect to FIG. 5. As with the identified records 302, the identified accounts 304 may be associated with one or more identified records 302 and identified characteristics 306. Each identified record 302 posted by a particular account may be indexed by that particular account, and each characteristic associated with identified records 302 posted by the identified account 304 may be indexed by unique characteristics associated with spam or good records as defined by the identified characteristics 306.

The characteristic database 210 further comprises a set of identified characteristics 306. The identified characteristics 306 comprise a set of characteristics that have been extracted from the identified records 302 and identified accounts 304. The identified characteristics 306 may include text strings common in known spam or known true records. For example, the identified characteristics 306 may indicate that business records which refer to "VIAGRA" or "CIALIS" are typically spam queries.

The identified characteristics 306 may also examine different elements of the business record in detail, such as business name, location, website, proprietor, type of business, and the like. For example, the identified characteristics 306 may indicate that business records that link to a website "widgets4less.com" are typically spam queries. The identified characteristics 306 are typically used by a module, such as the listing identification module 212 described with respect to FIG. 2, which examines business records 214 within the business records database 206 for similarities to known spam records or known true records.

Many of the characteristics and associations described with respect to spam queries could also be used to define characteristics of true queries. For example, the listing identification module 212 may apply a "white-list" method of posting queries (i.e., a query is posted only if it has characteristics of a known true record) as opposed to a "black-list" method of preventing queries (i.e., a query is posted unless it has characteristics of known spam records), or some combination thereof.

The identified characteristics 306 may also be extracted from particular accounts, rather than individual records. For example, the identified characteristics 306 may include information that accounts which tend to post listings in pharmacy, jewelry, and fashion listings (each of which are known as associated with spam marketing) tend to be more likely to be spam accounts than accounts which post in only one of the example fields. For example, exemplary characteristics might include whether the business uses a Voice Over Internet Protocol (VoIP) number, whether the business uses a website which forwards to a different website, the title of the business, the description of the business, whether the business zip code matches the geographical location of the registered phone number, and the like.

The methods below describe computer-implemented methods performed by devices, such as the business listing server 104 or a characteristic database 210. These methods generally describe functions that may be performed by a computer processor or processors programmed by software, firmware, or other instructions. Aspects of the methods are generally interchangeable between the business listing server and any separate spam detection computing nodes. As such, it should be understand that language indicating that "the method" performs an action is attributable to the hardware and software performing the method.

Figure 4:
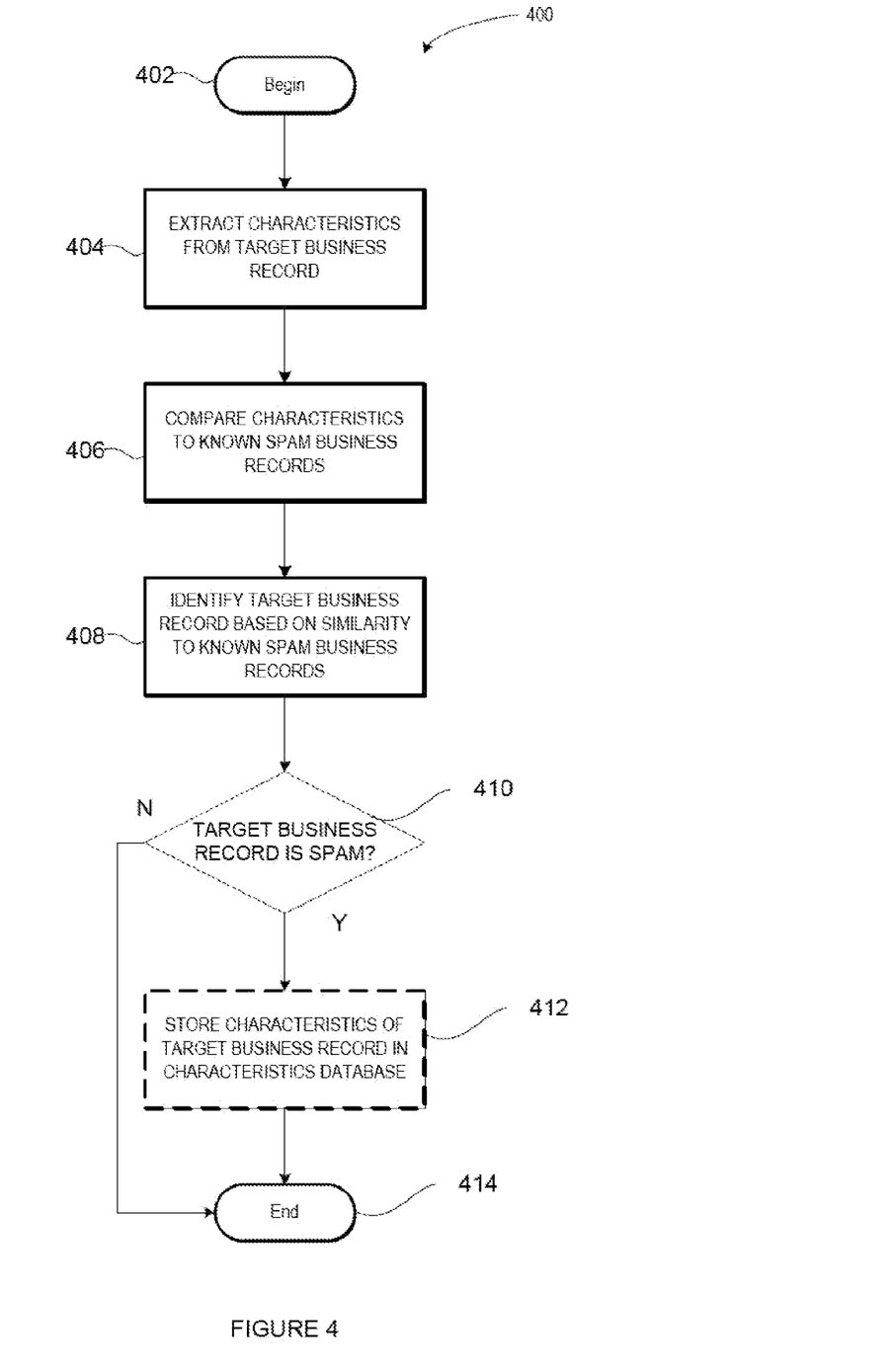
FIG. 4 is a flow diagram depicting a method for identifying a business record in accordance with aspects of the invention.

FIG. 4 is a flow diagram depicting a method 400 for identifying business records in accordance with aspects of the present invention. The method 400 begins by extracting characteristics from a record at step 404. At step 406, the method 400 compares the extracted characteristics with characteristics of other previously identified records. The method 400 determines the type of the record from the comparison at step 408. The method 400 may then optionally store the characteristics of the identified record in a characteristic database at steps 410 and 412 if the record is identified as spam.

The method 400 begins at step 402 when a target business record is selected for identification. For example, the business record may be for "Joe's Counterfeit Watches," located at "123 Fake Street." While the aspects described with respect to FIG. 4 relates to identifying a spam record as such, such a method 400 could also easily be modified to identify records as true records by comparing a target record to known characteristics of known true records. The method 400 then proceeds to step 404.

At step 404, the method 400 analyzes the target business record to extract certain characteristics associated with the record. For example, the method 400 may perform a text search for specific strings or values within sections of the business record, such as the business name, location, type, parent company name, and the like. Using the example described above, the method 400 may use the address "123 Fake Street" as a characteristic of the business record. As above, examples of characteristics that are analyzed may include whether the business uses a Voice Over Internet Protocol (VoIP) number, whether the business uses a website which forwards to a different website, the title of the business, the description of the business, whether the business zip code matches the geographical location of the registered phone number, and the like. After extracting the characteristics of the target business record, the method 400 proceeds to step 406.

At step 406, the method 400 examines the extracted characteristics and compares them to known characteristics, such as the identified characteristics 306 contained within the characteristics database 210. The method 400 may generate a score for the target record based upon the number of the same or similar characteristics found within the database 210. The comparison may result in a similarity value to one or more identified records 302 contained within the characteristics database 210. To continue the example, the method 400 may identify that the record is associated with a fake address by, for example, searching for "123 Fake Street" and realizing that the address does not exist in the city in which the record is reported. One possible characteristic of spam records is a lack of a real address. Thus the record for "Joe's Counterfeit Watches" has at least one characteristic associated with a spam record. After performing the comparison to the identified characteristics, the method proceeds to step 408.

At step 408, the method 400 identifies whether the target record is a spam record or a true record by analyzing the similarities determined in the comparison at step 406. The comparison may generate a score for the target record, and if the score is above or below a certain threshold value, the method 400 may identify the record as a spam record or a true record. As such, the method 400 is able to identify a target record as a spam record or a true record by comparing the target record to characteristics of previously identified records. Since the record used in the example above is associated with a fake address, and spam records may typically be associated with fake addresses, the method 400 may conclude that the record is a spam record. In other aspects, the method 400 may examine multiple factors other than the street address to determine a spam likelihood score, as described above. The method 400 may then optionally proceed to step 410, in order to update the characteristic database, or it may end at step 414.

At step 410, if the target record has been identified as a spam record, the method 400 proceeds to step 412 to update the known spam characteristics with further characteristics of the target record. If the target record has not been identified as a spam record, the method 400 ends at step 414.

At step 414, the target record has been identified as a spam record and the method 400 will update a characteristic database, such as the characteristic database 210 described with respect to FIG. 3. To update the characteristic database, the method 400 may add the characteristics of the target record as extracted at step 404 to the identified characteristics 304. The method 400 may also examine data associated with the account that uploaded the target record, and other records posted by that account. A method of classifying this information and updating the characteristic database is described below (See FIG. 5). After updating the characteristic database, the method 400 ends at step 414.

Figure 5:
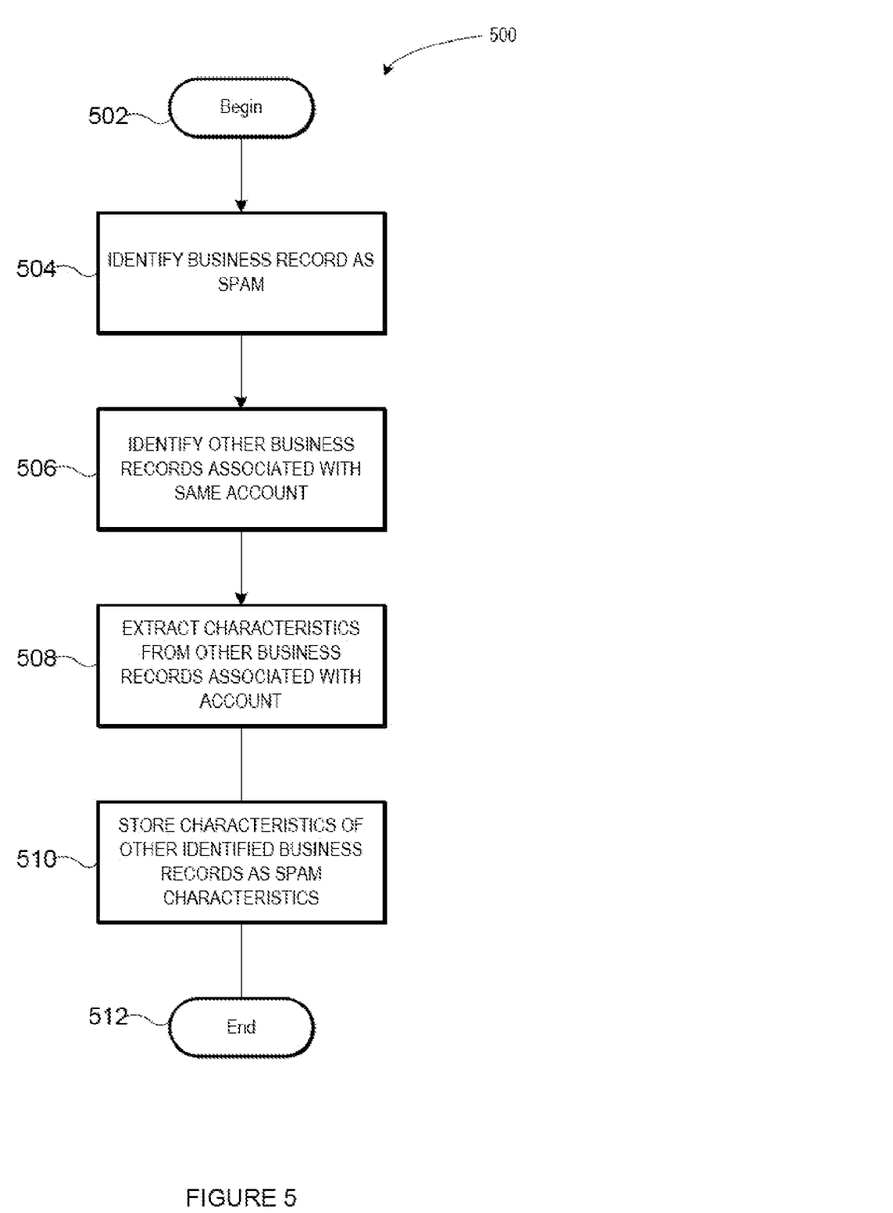
FIG. 5 is a flow diagram depicting a method for classifying business record characteristics in accordance with aspects of the present invention.

FIG. 5 is a flow diagram depicting a method 500 for classifying business records in accordance with aspects of the present invention. The method 500 begins by identifying a particular business record as spam at step 504. At step 506, the method 500 identifies other business records associated with the same account that posted the record identified as spam at step 504. At step 508, the method 500 extracts characteristics from the other business records. At step 510, the characteristics of the spam record and other associated records are stored in a database, such as the characteristic database 210.

The method 500 begins at step 502 and proceeds to step 504. At step 504, a business record is identified as a spam record, such as by the method 400 described with respect to FIG. 4. After identifying the business record as a spam record, the method proceeds to step 506.

At step 506, the spam record is analyzed to determine one or more accounts to which it is associated, such as the account that posted the record. If an account has posted a first record, it is likely that other records posted by the same account are also spam records. As such, the method 500 determines which other records are associated with the account that was associated with the identified spam record. After identifying the other records associated with the account, the method proceeds to step 508.

At step 508, the method 500 extracts characteristics from the other records associated with the account. Because the account posted a first spam record, it is likely these other records are also spam, so characteristics associated with the other records are likely also spam characteristics. After extracting the characteristics associated with the other records, the method 500 proceeds to step 510.

At step 510, the method 500 stores the characteristics extracted at step 508 within the characteristic database, as identified spam characteristics. These characteristics may then be used to identify other records as spam or true, such as by the method 400 described with respect to FIG. 4. After storing the extracted characteristics, the method 500 ends at step 512.

In this manner, the business listing server 104 facilitates an expeditious identification of potentially false listings. Hence, aspects of the business listing server 104 serve to ensure that business listings are "true" listings, and that only true listings are presented to users and services accessing the business listing server 104.

In the manner described above, the system and method advantageously allow for the detection of spam business records. By identifying these records, they may then be filtered out of the business listing server, thus improving the quality of the results provided by the listing server. By basing the detection upon previously detected characteristics of spam records, the system and method provide for flexible adjustments to new types of spam records.

Although aspects of the invention herein have been described with reference to particular aspects, it is to be understood that these aspects are merely illustrative of the principles and applications of the present invention. It is therefore to be understood that numerous modifications may be made to the illustrative aspects and that other arrangements may be devised without departing from the spirit and scope of the invention as defined by the appended claims. Furthermore, while certain operations and functions are shown in a specific order, they may be performed in a different order unless it is expressly stated otherwise.

The invention claimed is:

1. A computer implemented method for identifying business records, the method comprising:

extracting, using the one or more computing devices, one or more characteristics from a target business listing that has been provided by an account;

comparing, using the one or more computing devices, the extracted characteristics to a set of known characteristics associated with one or more known business listings of a known type, wherein the set of known characteristics are stored in a characteristic database;

identifying, using the one or more computing devices, a business listing type of the target business listing based on the comparison of the extracted characteristics to the set of known characteristics, wherein the identified business listing type of the target business listing comprises a spam business listing;

identifying, using the one or more computing devices, one or more other business listings that have been provided by the account;

identifying, using the one or more computing devices, one or more additional characteristics of the one or more other business listings;

updating, using the one or more computing devices, the characteristic database with the one or more characteristics from the target business listing and the one or more additional characteristics based on identification of the business listing type as a spam business listing; and filtering out listings identified as spam from a business listing server.

2. The method of claim 1, wherein the characteristics comprise at least one of a key word, an address, a phone number, or a type of business.

3. The method of claim 1, wherein the business listings are stored on a business listing server.

4. The method of claim 1, further comprising generating, using the one or more computing devices, a similarity value based on the comparison of the extracted characteristics and the set of known characteristics, and wherein identifying the business listing type is based on the similarity value.

5. The method of claim 1, further comprising determining, using the one or more computing devices, whether the target business listing is to be associated with a set of business listings, in a database of business listings, based on the identified business listing type.

6. A non-transitory computer-readable storage medium comprising instructions that, when executed by a computer process, cause one or more processors to execute a method comprising:

extracting one or more characteristics from a target business listing that has been provided by an account, wherein the one or more characteristics are from a predefined set of characteristics;

comparing the extracted characteristics to a set of known characteristics associated with a known business listing of a known type, wherein the set of known characteristics are stored in a characteristic database;

identifying a business listing type of the target business listing based on the comparison of the extracted characteristics to the set of known characteristics, wherein the identified business listing type of the target business listing comprises a spam business listing;

identifying one or more other business listings that have been provided by the account;

identifying one or more additional characteristics of the one or more other business listings;

updating the characteristic database with the one or more characteristics from the target business listing and the one or more additional characteristics based on identification of the business listing type; and filtering out listings identified as spam from a business listing server.

7. The non-transitory computer-readable storage medium of claim 6, wherein the characteristics comprise at least one of a key word, an address, a phone number, or a type of business.

8. The non-transitory computer-readable storage medium of claim 6, wherein the business listings are stored on a business listing server.

9. The non-transitory computer-readable storage medium of claim 6 wherein the instructions further cause the one or more processors to generate a similarity value based on the comparison of the extracted characteristics and the set of known characteristics, and wherein identification of the business listing type is based on the similarity value.

10. A processing system for identifying business listings, the processing system comprising:

at least one processor;

a listing identification module associated with the at least one processor; and memory for storing data including at least one target business listing and at least one known business listing of a known type, the memory coupled to the at least one processor;

wherein the listing identification module is configured to:

extract one or more characteristics from the target business listing, wherein the one or more characteristics are from a predefined set of characteristics;

compare the extracted characteristics to a set of known characteristics associated with the known business listing, wherein the set of known characteristics are stored in a characteristic database, generate a similarity value based on the comparison of the extracted characteristics and the set of known characteristics, identify a business listing type of the target business listing based on the similarity value, and the known business listing type, wherein the identified business listing type of the target business listing comprises a spam business listing, identify one or more other business listings that have been provided by the account, identify one or more additional characteristics of the one or more other business listings, update the characteristic database with the one or more characteristics from the target business listing and the one or more additional characteristics based on identification of the business listing type as a spam business listing; and filtering out listings identified as spam from a business listing server.

* * * * *